(12) United States Patent
Daly

(10) Patent No.: US 6,441,867 B1
(45) Date of Patent: Aug. 27, 2002

(54) BIT-DEPTH EXTENSION OF DIGITAL DISPLAYS USING NOISE

(75) Inventor: Scott Daly, Kalama, WA (US)

(73) Assignee: Sharp Laboratories of America, Incorporated, Camas, WA (US)

( * ) Notice: Subject to any disclaimer, the term of this patent is extended or adjusted under 35 U.S.C. 154(b) by 0 days.

(21) Appl. No.: 09/426,165

(22) Filed: Oct. 22, 1999

(51) Int. Cl.[7] ................................................. H04N 5/21
(52) U.S. Cl. ....................... 348/607; 348/615; 348/617; 348/618; 382/275
(58) Field of Search ................................ 348/607, 612, 348/615, 617, 618, 621, 622, 627, 624; 382/275, 254, 162; H04N 5/21, 5/213, 5/217

(56) References Cited

U.S. PATENT DOCUMENTS

| | | |
|---|---|---|
| 3,244,808 A | 4/1966 | Roberts |
| 3,562,420 A * | 2/1971 | Thompson .................. 348/607 |
| 3,739,082 A | 6/1973 | Lippel |
| 3,961,134 A | 6/1976 | Jarvis |
| 4,268,861 A * | 5/1981 | Schreiber et al. ......... 375/240.1 |
| 4,758,893 A | 7/1988 | Lippel |
| 4,956,638 A | 9/1990 | Larky et al. |
| 5,111,310 A | 5/1992 | Parker et al. |
| 5,138,303 A | 8/1992 | Rupel |
| 5,164,717 A | 11/1992 | Wells et al. |
| 5,201,030 A | 4/1993 | Carrie |
| 5,218,649 A | 6/1993 | Kundu et al. |
| 5,254,982 A | 10/1993 | Feigenblatt et al. |
| 5,311,180 A * | 5/1994 | Borgen ........................ 341/131 |
| 5,525,984 A | 6/1996 | Bunker |
| 5,557,429 A | 9/1996 | Hirose |
| 5,619,230 A | 4/1997 | Edgar |
| 5,651,078 A | 7/1997 | Chan |
| 5,696,602 A | 12/1997 | Cooper et al. |
| 5,809,178 A | 9/1998 | Anderson et al. |
| 5,920,653 A | 7/1999 | Silverstein |
| 6,040,876 A | 3/2000 | Pettitt et al. |

OTHER PUBLICATIONS

Patent Abstracts of Japan vol. 1998, No. 07, Mar. 31, 1998 & JP 09 185707 A (Texas Instr Inc & LT; TI>), Jul. 15, 1997 *abstract*.

* cited by examiner

*Primary Examiner*—John Miller
*Assistant Examiner*—Trang U. Tran
(74) *Attorney, Agent, or Firm*—Marger Johnson & McCollom, PC

(57) ABSTRACT

A method for extending bit-depth of display systems. The method includes the steps of measuring the static display noise of a display device, using the display noise to create pseudo-random noise and subtracting the pseudorandom noise from a contone image. After the noise-compensated image data is quantized and displayed, the noise in the display device will substantially convert the noise-compensated image data back to contone image data with few or no contouring artifacts. Other embodiments include using the inherent noise of the human visual system instead of the static display noise, or both. Specific adjustments can be made to the noise of the human visual system for color displays.

11 Claims, 6 Drawing Sheets

BIT-DEPTH EXTENSION OF DIGITAL DISPLAYS USING NOISE

BACKGROUND OF THE INVENTION

1. Field of the Invention

This invention relates to digital displays, more particularly to methods for extending the bit depth of displays using display noise and exploiting aspects of the human visual system.

2. Background of the Invention

Continuous tone, or contone, imagery usually has 24 bits/pixel as a minimum. Eight bits are allocated for each color in typical displays. However, lower cost displays have limitations on the number of bits they can have per pixel. The limitations come from limited memory in video random access memory (VRAM), the characteristics of the display itself, or from digital to analog converters (DAC) used in some cathode ray tube (CRT) displays.

For example, in typical laptop computers the highest gray-level resolution is typically the 'thousands of colors' mode. This mode corresponds to 16 bits/pixel, rather than the 24 bits/pixel in larger computers or those having more VRAM. The 16 bits are typically allocated 5 bits for red, 6 bits for green and 5 bits for blue. In lesser quality products only 15 bits/pixel are used, with 5 bits allocated per color. The number of bits per pixel will be referred to as bit-depth.

In displays having limited bit-depth, contour artifacts appear in smooth gradient regions. For example, an image that includes part of the sky will show visible contour lines in the smooth gradient blue regions of the sky. Previous and current techniques for reduction of these artifacts exist.

L. G. Roberts performed some of the original work in this area in the area of contour prevention for pulse code modulation (PCM) coded and transmitted images. As this was the beginning of image compression efforts, it was a significant achievement to compress the image from 7 bits/pixel to 2 or 3 bits/pixel. The compression technique used a gray level resolution reduction via amplitude quantization. The primary distortion was the contouring artifacts, often manifested as false edges in slowly varying gradients.

Figure 1:
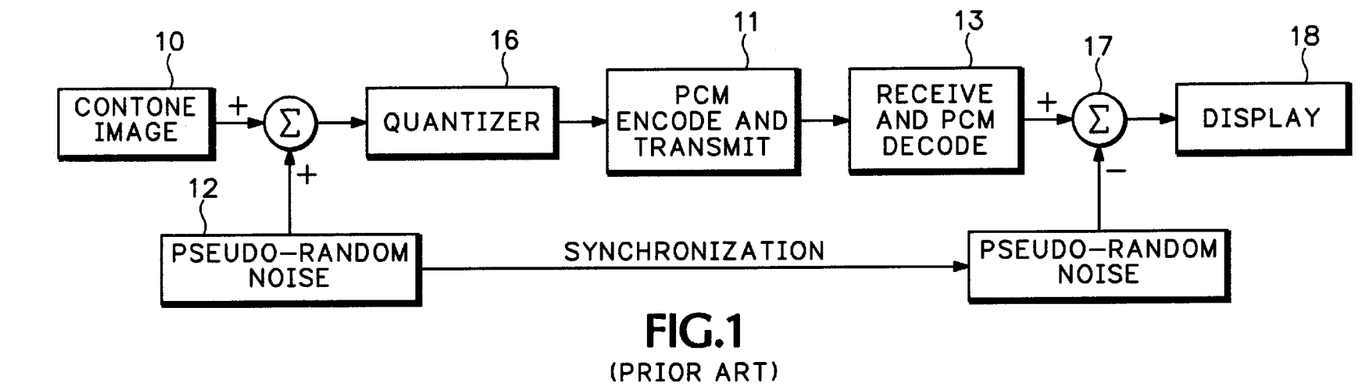
FIG. 1 is a prior art example of Roberts' Noise Modulation applied to displays.

In the Roberts technique, show in prior art FIG. 1, a one-dimensional white noise sequence that is predetermined is added to an image during a raster scan prior to quantization. Because the noise sequence is predetermined it is often referred to as pseudo-random noise. To avoid detracting from the image quality, the noise is removed after it is received, just prior to display of the data to which it was added. The subtracted noise is in phase with and identical to the transmitter noise. The noise effectively breaks up the contouring artifacts.

At the time this technique was promulgated, the breaking up of contouring artifacts was an empirical observation. However, it has come to be understood that the elements along the contour are varied in their orientation by the noise, so that they fall outside the association field for the visual system. The quantization process leaves some noise in the image, since it occurs between the steps of adding and then subtracting the noise.

This work has been largely ignored, since it was a compression technique. The newer techniques of digital pulse code modulation (DPCM) and discrete cosine transform (DCT) have enabled larger amounts of compression without contouring artifacts. These techniques accomplish this primarily by shifting the compression process from the spatial domain to the frequency domain.

Application of the Roberts' method can be found in U.S. Pat. Nos. 3,244,808, and 3,739,082. The first patent, issued in 1966, implements a system similar to that shown in prior art FIG. 1. In this patent, the distribution of the noise is uniform and assumed to be white noise. In the second patent listed above, the system adds noise as in Roberts' approach, but does not remove noise at the receiver. The applied noise is in an ordered pattern.

These techniques are typically referred to as microdither to differentiate it from dither, a term more commonly applied to halftoning techniques. Halftoning dither is a spatial dither, but the microdither is an amplitude dither. A great deal of work has been done in halftoning, both for displays and printing applications. The references fall generally in two categories, either general dithering approaches using noise, or approaches specifically directed to eliminating the contour artifacts.

A general dithering approach for display systems can be found in U.S. Pat. No. 3,961,134, issued Jun. 1, 1976. A quantized image is compared against a dither matrix. The dither matrix contains all values of grayscale appearing once, and therefore the size is dependent on the desired grayscale resolution. Other examples suffer from this limitation, as seen by U.S. Pat. No. 5,164,717, issued Nov. 17, 1992.

Other dithering approaches do not have a predetermined size for the dither array. In U.S. Pat. No. 4,758,893, issued Jun. 19, 1988, the size of the dither array is triggered by phase. Additionally, the description refers to characteristics of the human visual system. However, the reference is very general and essentially means that the spatial and temporal frequencies in the dithering patterns are high.

Use of the human visual system characteristics can also be found in U.S. Pat. No. 5,619,230, issued Apr. 8, 1997. The noise used is high-pass noise, but is applied in direct proportion to the visual system's sensitivity across frequency. Other approaches use high-pass noise, or approximation of it. For example, U.S. Pat. No. 5,111,310, issued May 5, 1992, suggests designing the dithering array in such a manner that the resulting halftone patterns approximate blue (high-pass) noise.

The more common definition of dithering can be found in U.S. Pat. No. 4,956,638, issued Sep. 11, 1990. In this patent, dithering is defined as using a pattern of two colors or gray levels that are close to the desired color or level. When the eye averages the two colors or levels, they appear to be the desired color. This use of more than one bit for dithering is referred to as multi-bit dithering.

Other approaches to multi-bit dithering limit the size of the dither array for each pixel. For example, U.S. Pat. No. 5,138,303, issued Aug. 11, 1992, uses a dither array for each pixel that is 2×2. Other techniques base the size of the dither array on the number of desired gray levels. This is shown in U.S. Pat. No. 5,696,602, issued Dec. 9, 1997, where the dither array size of 16×16 results in 256 levels.

Dithering is applied in general cases as discussed above, and for specific problems. In one case where clipping and gray scale error function were the problems, multi-bit dithering was applied. This is found in U.S. Pat. No. 5,201,030, issued Apr. 6, 1993.

As mentioned above, the specific artifact under discussion is that of contouring, false edges in slowly varying gradients. Several techniques, including the addition of noise as in dithering, have been used to overcome this problem.

One approach is to segment the image into two regions, one of edges and one of non-edges, as shown by U.S. Pat.

No. 5,218,649, issued Jun. 8, 1993. Each segment is filtered differently. The intention was for a post-processing for compressed and decompressed images.

Other techniques are directed to a particular compression or decompression technique. For example, U.S. Pat. No. 5,651,078, issued Jul. 22, 1997, addresses contouring artifacts in MPEG (Moving Pictures Experts Group) and MPEG2 schemes. In these schemes, contouring can occur in the dark areas of images. The technique applies different gains to the areas, boosting the captured image noise to break up the artifacts.

Contouring as a particular example of amplitude quantization artifact is discussed in U.S. Pat. No. 5,809,178, issued Sep. 15, 1998. The technique suggests performing an experiment to determine the quantization interval based upon noise already present in the image. It suggests that the interval of noise/quantization should be 3/8.

Finally, contouring artifacts in print are addressed by U.S. Pat. No. 5,920,653, issued Jul. 6, 1999. It uses two channels, one layer is a channel making large dots and the other is a channel making small dots.

However, none of these approaches solves the problem in a robust, computationally simple manner. Further, dithering techniques typically reduce the spatial resolution of the image. Therefore what is needed is a method of eliminating or reducing the contouring artifacts that is computationally simple and does not reduce the spatial resolution of the image.

SUMMARY OF THE INVENTION

One aspect of the invention is a method for extending the bit-depth of display devices using the static noise of the display device. The method includes measuring the static noise of the display device and subtracting it from contone image data. The noise-compensated image data is then quantized and displayed. The static noise of the display device substantially converts the noise compensated image data back to contone image data. The use of the noise breaks up contouring artifacts and leaves little visible noise in the image or images displayed.

Another aspect of the invention using the inherent noise in the human visual system (HVS) instead of the static display noise as the subtraction, or pseudo-random noise. A further embodiment uses both types of noise. Several different adjustments can be made to the use of the HVS noise specifically for color displays.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

As discussed previously, FIG. 1 shows a prior art embodiment of application of Roberts' noise modulation to transmission systems. A contone image, 10, which in this example has 6 bits/pixel, is combined with a one-dimensional, predetermined, white noise sequence, pseudo-random noise 12. The noise is subtracted at 17 after the image data is quantized 16, encoded and transmitted 11, and received and decoded 13. The quantization process left some residual noise in the image due to the quantization being between the addition and subtraction steps.

The encoding scheme used was pulse code modulation (PCM) and dropped the bits/pixel from 6 to 2. This work was largely based upon the compression context and has fallen by the wayside, as compression techniques became more sophisticated. Digital pulse code modulation (DPCM) and discrete cosine transform (DCT) enable more compression without generating contouring artifacts, primarily by shifting compression from the spatial domain to the frequency domain.

Figure 2:
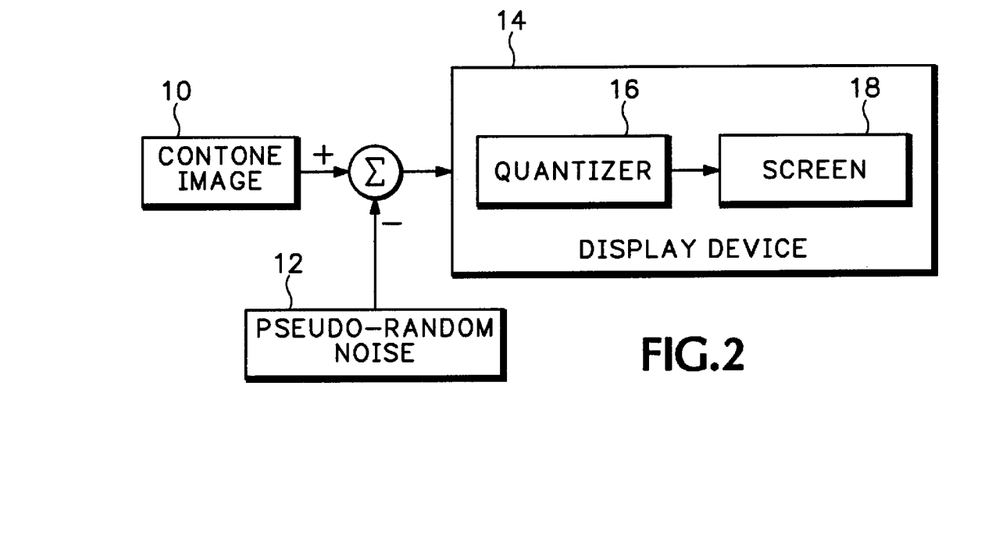
FIG. 2 shows one embodiment of applying noise to a bit-depth limited display system.

However, the general idea has some application to bit-depth limited displays. FIG. 2 shows one embodiment of an application of noise modulation to these displays. The contone image 10 is combined with pseudo-random noise 12 and then sent to the display device 14. The combined data is quantized by quantizer 16 and displayed on screen 18. Experiments testing this invention have shown that this technique is effective in reducing contouring artifacts, especially when going from 256 to 64 levels (8 bits/pixel to 6 bits/pixel). However, the inability to subtract the noise results in an image that has visible noise.

Generally, the objectives of this invention are to improve the image quality for bit-depth limited displays. This is accomplished by preventing of false contours and allowing signals of lower contrast than the quantization to be displayed. Further, it does this without causing any visible noise to appear on the display. The approach applies a simple pixel-wise add operation and the storage of a two-dimensional noise sequence. Alternatively, the two-dimensional noise is generated real-time rather than stored. In some embodiments, the noise of the human visual system is taken into account and the power spectrum of the noise is shaped in this regard.

Figure 3:
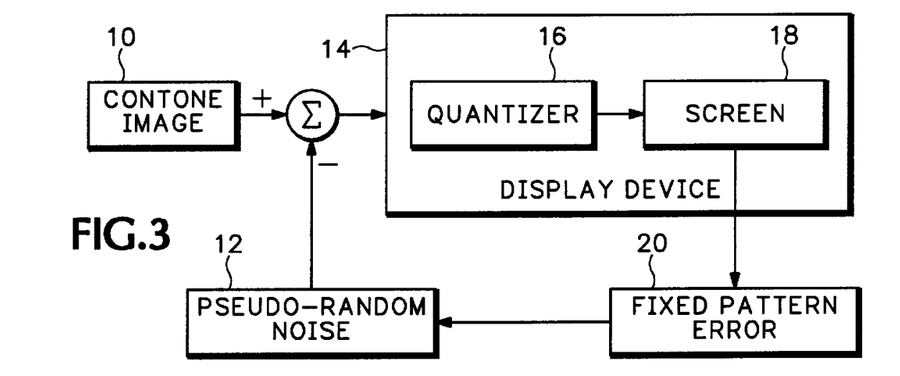
FIG. 3 shows one embodiment of using static display noise in a bit-depth limited display system.

One embodiment of the invention is shown in FIG. 3. The display device 14 is measured to determine its static display noise at 20. This noise is treated as the subtraction noise at the receiver in the context of FIG. 1. The noise array resulting from 20 is scaled from light units to digital code values to produce the pseudo-random noise 12. This noise is subtracted from the image prior to quantization, producing noise-compensated contone image data, and the inherent noise in the display device cancels it out. Other alternatives include adding the inverse of the noise to the contone image. Both of these as well as other techniques will be referred to as subtracting the static display noise. There will be a small residual noise due to the quantization, but the display device will substantially cancel the noise compensation.

It must be noted that the display noise in terms of this invention is the static display noise. Most viewers associate display noise with the continuously changing noise in an image, which is actually the dynamic noise. All displays have a static noise associated with them. For example, the typical cathode-ray tube display (CRT) has noise associated with the phosphors used to form images.

In implementation for manufacturing, this measurement can be performed for each display as it is manufactured. Otherwise, display modeling can be used to determine the inherent noise for a class or category of displays. This may be further adapted as will be discussed with regard to FIG. 4b.

Figure 4A:
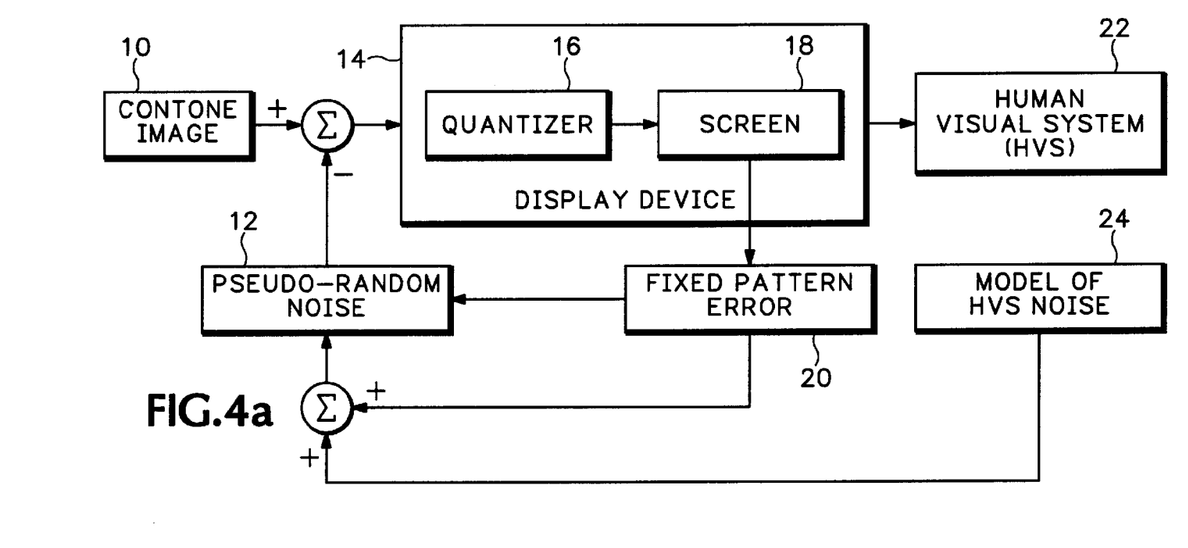
FIGS. 4a and 4b show embodiments of using human visual system noise in a bit-depth limited display system.

In addition to the display noise, adaptation can be made to include aspects of the human visual system. This is shown in FIG. 4a. The human visual system 22 can be modeled using several different models 24. One example would be a simple two-dimensional isotropic Gaussian low-pass filter as a model of the contrast sensitivity function (CSF). The combination of the display noise 12 and the HVS noise 24 is shown as an addition. However, it could be a multiplication, an addition in log space, or other nonlinear combination, such as an addition in a gamma-corrected space.

The power spectra of the noise added to the image will be inversely proportional to the HVS luminance sensitivity as a function of frequency. This is opposite to the approach discussed in U.S. Pat. No. 5,619,230, as mentioned previously. Again the step of subtracting the noise, be it HVS noise or display noise, will result in noise-compensated image data. The HVS noise is dynamic noise so it will not be completely canceled out by the HVS 22. However, the noise will be at least partially eliminated, partially converting the noise-compensated image data back to contone image data.

As mentioned above, FIG. 4b shows a possible implementation that may occur in manufacturing situations. If the inherent display noise is low relative the assumed HVS noise, the display noise may be discounted completely and the only noise subtracted from the image is the HVS noise. This may be the most practical approach for manufacturing constraints, as no measurement of the individual display noise is necessary. The pseudo-random noise 12, then, is only comprised of the noise provided from the HVS model 24.

Figure 4B:
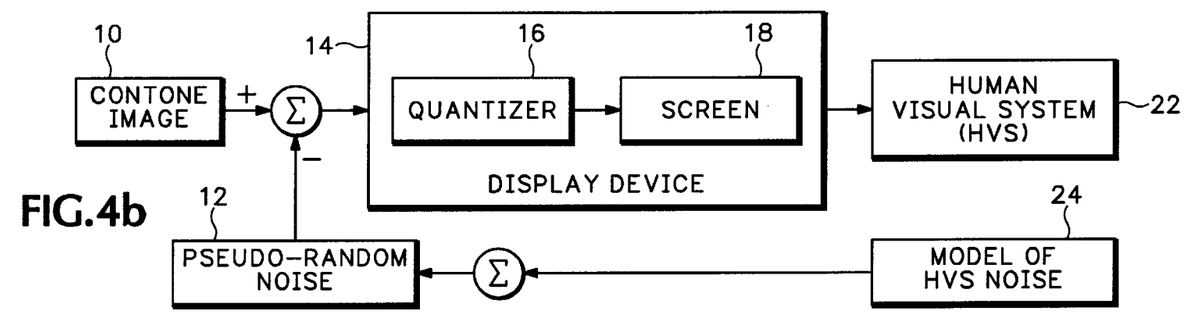

The invention as embodied in FIGS. 3 and 4a–b can be adapted specifically for color displays in several ways. The general approaches above can be applied to color display directly, or it can be tailored in several ways, depending upon the desires of the designer and the characteristics of certain displays.

Figure 5A:
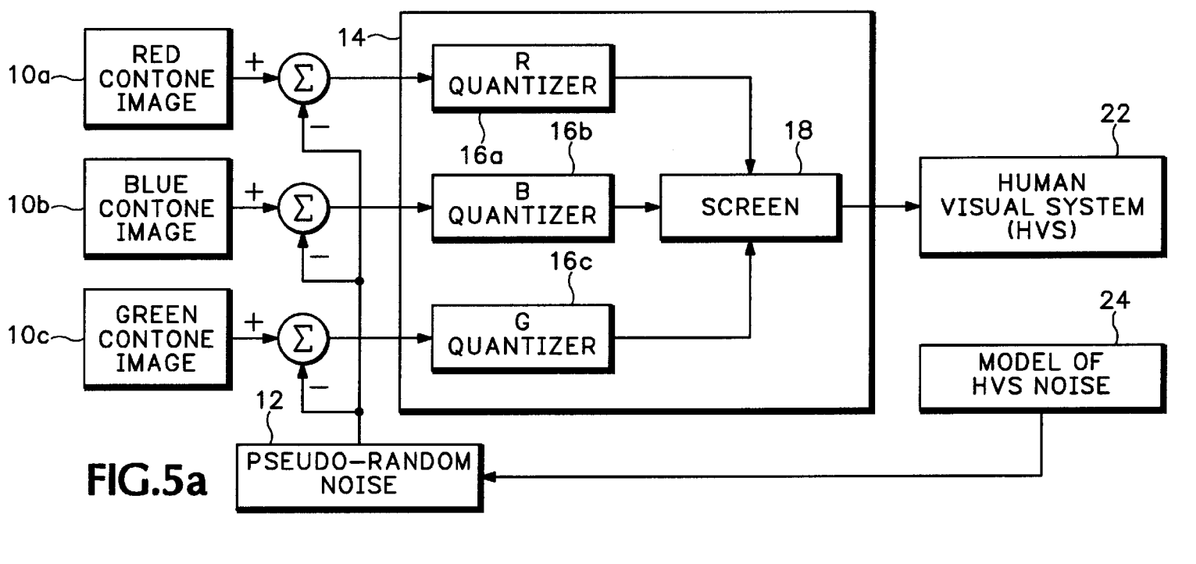
FIGS. 5a–5d show alternative embodiments of color-specific noise applications in bit-depth limited display systems.

FIG. 5a shows an application of the invention to an RGB color display using achromatic noise. The same noise field 12 is added to all three color planes 10a–c of the image. Each color plane will be quantized separately by quantizers 16a–c and displayed on display screen 18. A minor adaptation of this technique scales the R, G, and B noise fields by their inverse contribution to the luminance signal. This would occur in the model of the HVS 24. However, this can have drawbacks if there are uncompensated gray scale nonlinearities in the display.

Figure 5B:
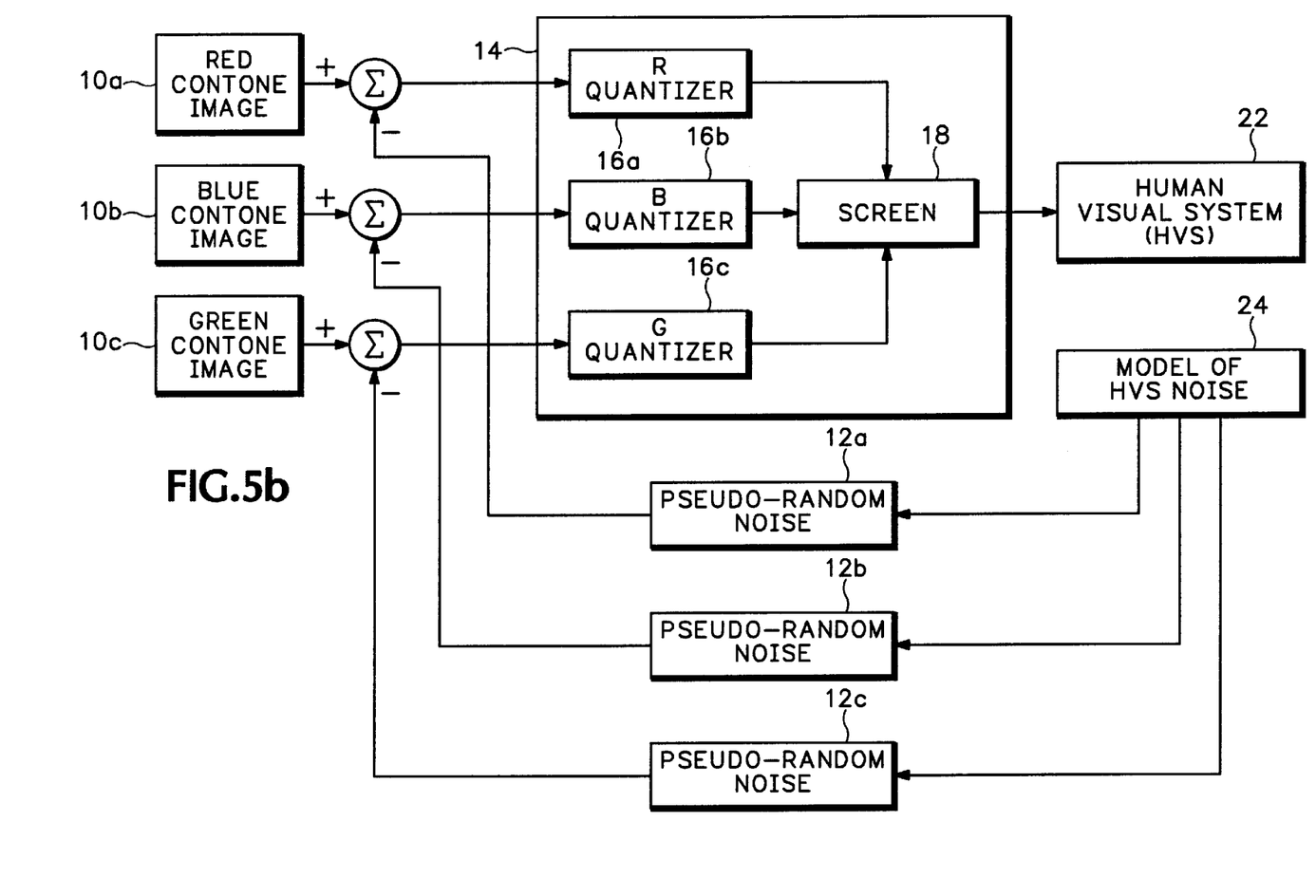

A possibly more accurate approach in terms of more contour prevention with lower visibility of noise, but one that requires more memory, is shown in FIG. 5b. Here the HVS model 24 is a chromatic model that generates three different pseudo-random noise planes 12a–c. The model includes the equivalent input noises of the luminance channel and two isoluminant color channels of the visual system, analogous to the L*, A*, and B* channels of the CIELAB color metric. In addition, different CSFs for these three channels are used, each having different bandwidths and shapes. This is in order to generate three equivalent input noise pseudo-random images. These are then converted from the L*, A*, B* domain to the RGB domain for adding to the image prior to the quantization.

One of the key advantages of this approach is that the noises are independent from color layer to color layer, causing the luminance noise formed from the weighted sum of RGB to be less than that of the previous embodiment shown in FIG. 5a. Another advantage is that the noises can be very high at high frequencies in the isoluminant RIG and BIY layers due to their respective lower bandwidth CSFs, relative to the luminance CSF. This allows all three layers to be reduced in magnitude for the same level of contouring reduction.

Figure 5C:
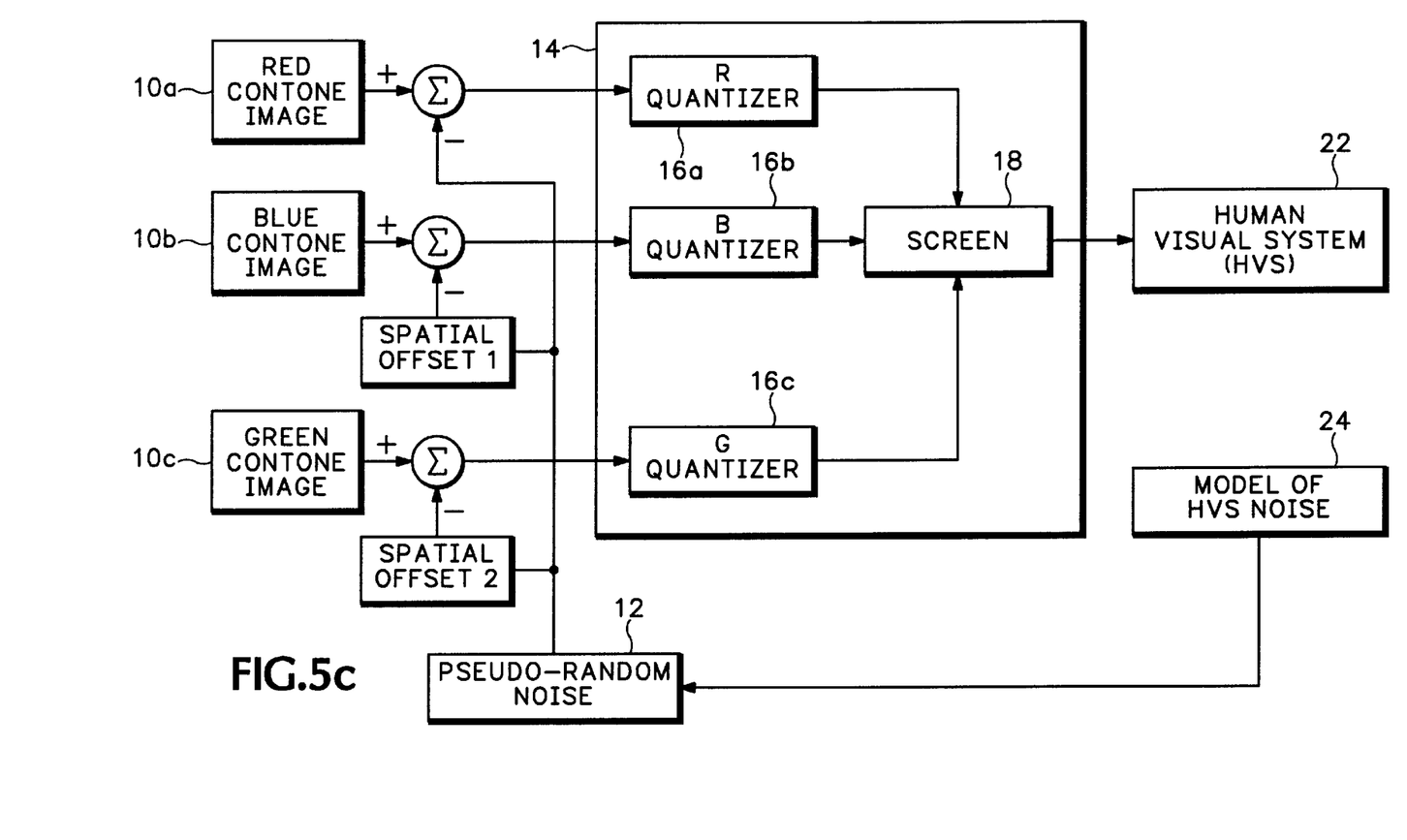

FIG. 5c shows an implementation of this with some efficiencies introduced to overcome the memory problem of the system of FIG. 5b. A single noise field 12 is generated, using an achromatic model of the HVS 24. The noise field is then added to the color planes using spatial offsets of different amounts for each layer. This renders the three layers quasi-independent, resulting in lower amplitude luminance signals. Since the noise is not low-pass, the autocorrelation distances are very short, leaving the color planes with an effectively independent color noise.

Figure 5D:
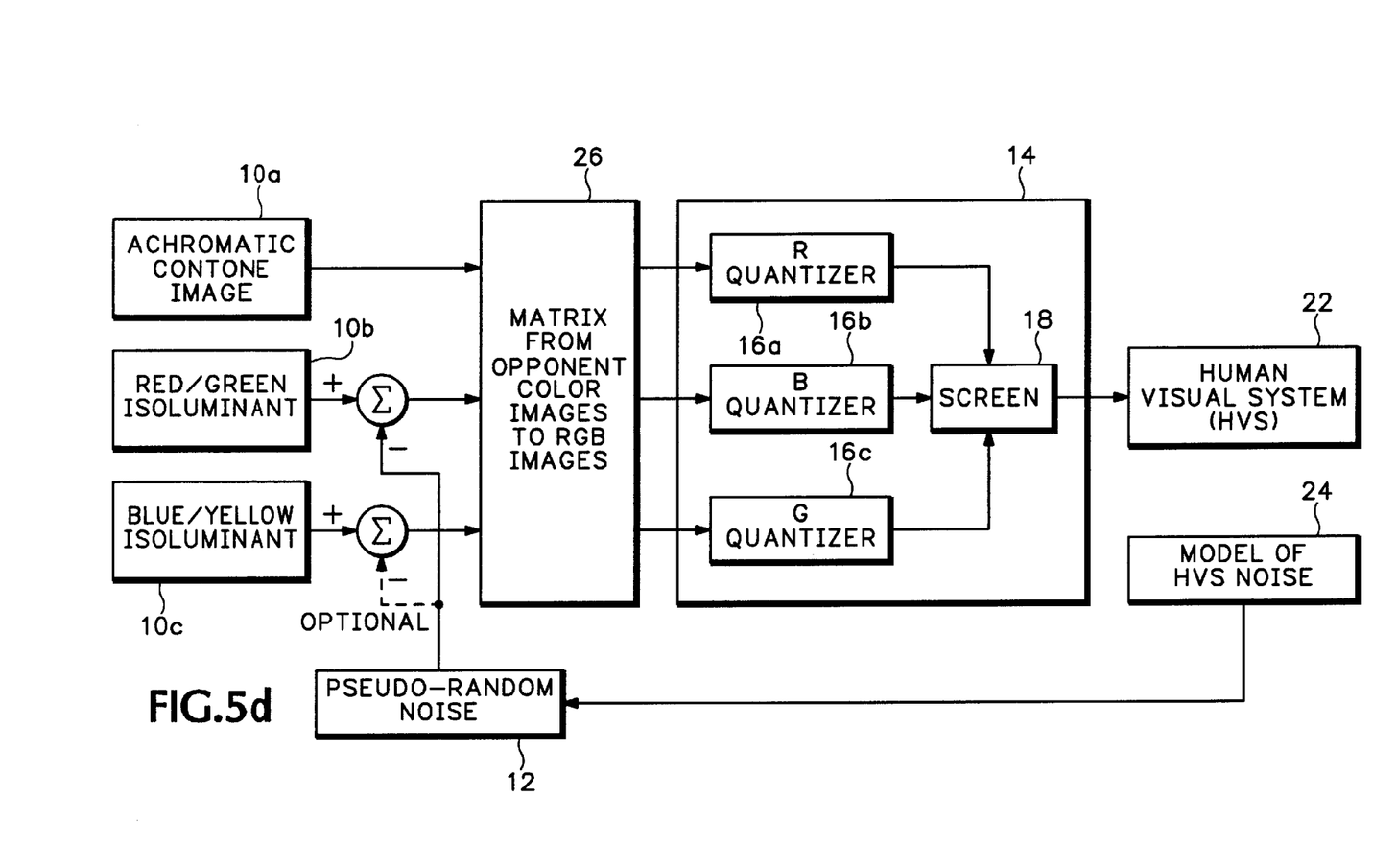

Depending upon the forms in which the image is available, a further embodiment as shown in FIG. 5d can be applied. If the image is available in CIELAB color component space, for example, the noise can be added directly to the A* or B* layers, or both. These are approximately isoluminant, so no luminance signal is generated. The HVS has the most sensitivity to the luminance signal, so this approach allows the contours to be broken up with the least noise visibility. This is done not only prior to the quantizers 16a–c of the display, but also prior to the opponent color to RGB matrix step 26. The implementer must be careful of clipping at the opponent color to RGB matrix. In this implementation, the sum of noise across complimentary colors is not constant, but the achromatic component, a weighted sum of R, G and B, is. In a further adaptation, the spatial offsets shown in FIG. 5c could be applied here as well.

It must be noted that the embodiments with specific details to color displays are given in the context of the HVS noise only, only for ease of discussion. These embodiments can include the static display, or fixed pattern error, noise 20 of FIG. 4a as well. There is no intention to limit the application of the invention in this manner.

The application of the general approaches, using static display noise, HVS noise or both, can effectively extend the bit-depth of bit-depth limited displays. Experiments have shown that the perceived bit-depth can be increased from 6 bits/pixel to 8 or 9 bits/pixel.

Thus, although there has been described to this point a particular embodiment for a method and structure for bit-depth extension of displays, it is not intended that such specific references be considered as limitations upon the scope of this invention except in-so-far as set forth in the following claims.

What is claimed is:

1. A method for extending bit-depth of display systems, comprising the steps of:
   a) measuring static display noise of a display device;
   b) creating pseudo-random noise using the static display noise of a display device;
   c) subtracting the pseudo-random noise from image data, thereby producing noise-compensated image data;
   d) quantizing the noise-compensated image data; and
   e) displaying the noise-compensated image data, whereby the noise-compensated image data is substantially converted back to image data at the display device.

2. The method of claim 1 wherein the creating pseudo-random noise step further comprises determining human visual system noise and combining the human visual system noise with the static display noise.

3. A method for extending bit-depth of display systems, comprising the steps of:

a) determining human visual system noise;

b) creating pseudo-random noise from the human visual system noise;

c) subtracting the pseudo-random noise from image data, thereby producing noise-compensated image data;

d) quantizing the noise-compensated image data; and e) displaying the noise-compensated image data, whereby the noise-compensated image data is at least partially converted back to image data by a human visual system.

4. The method as claimed in claim 3, wherein an achromatic model is used for determining the human visual system noise.

5. The method as claimed in claim 4, wherein one noise field is added to each color plane.

6. The method as claimed in claim 4, wherein the noise field is spatially offset differently for each color plane.

7. The method as claimed in claim 3, wherein a chromatic model is used for determining the human visual system noise.

8. The method as claimed in claim 7, wherein a different noise field is generated for each color plane.

9. The method as claimed in claim 7, wherein noise is added prior to conversion from opponent color to RGB.

10. The method of claim 3, wherein the creating pseudo-random noise step further comprises measuring static display noise of a display device and combining the static display noise with the human visual system noise.

11. A method for extending bit-depth of display system, comprising the steps of:

a) determining human visual system noise;

b) measuring static noise of a display device;

c) combining the human visual system noise and the static noise of a display device to create pseudo-random noise;

d) subtracting the pseudo-random noise from image data, thereby producing noise-compensated image data;

e) quantizing the noise-compensated image data; and f) displaying the noise-compensated image data.

* * * * *